Nov. 22, 1932.  R. WEINGAUD  1,888,402
UNITING LACQUERED CELLULOSE FOILS
Filed July 9, 1929
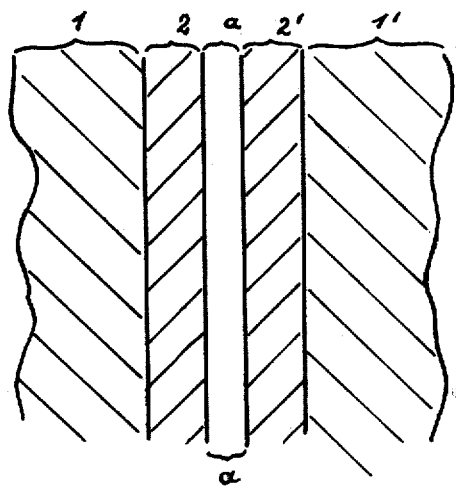
Inventor:
Richard Weingaud Patented Nov. 22, 1932

1,888,402

UNITED STATES PATENT OFFICE

RICHARD WEINGAUD, OF BOMLITZ, NEAR WALSRODE, GERMANY

UNITING LACQUERED CELLULOSE FOILS

Application filed July 9, 1929, Serial No. 377,063, and in Germany July 31, 1928.

This invention has reference to adhesively connecting surfaces of different material to each other and in particular to the connection of superficially coated bodies, and it is intended to provide for a more reliable and secure connection of these exterior coatings to each other than generally obtainable heretofore and to avoid the separation of the coatings from the coated surfaces and the destruction of the coatings and to generally obtain other important objects and advantages which will appear as the specification proceeds. The tearing strength and resistance of the adhesive connection of two surfaces is governed by the reliability of the adhesion of the gluing or connecting agent applied to the surfaces to be pasted to each other and generally anchored in the capillary walls of the surfaces, and it further depends on the cohesion between the individual particles of the gluing or adhesive agent. The strength of connection obtained by the gluing together of the surfaces increases with the formation of a gel, inasmuch as the gluing agent is retained on the capillary walls by adsorption while the required gel-structure is preserved by the forces of cohesion. In order to provide for the entering of the adhesive agent into the pores of the surfaces to be connected it should be adapted to wet these surfaces, inasmuch as it is well known that gelatine coats will break and come off from surfaces of metal or hard rubber in view of the fact that these substances are not wetted by aqueous solutions of gelatine, so that the adhesive intensity of these agents to the surfaces mentioned is very low.

Still more complicated and uncontrollable are the conditions for the connection by adhesives of surface coatings of varnish or the like to each other. In the case of employing adhesive agents for such coatings which possess a sufficient degree of adhesiveness and connecting property with relation to the outer surfaces to be directly connected of the coatings of varnish, that is to say when employing agents of satisfactory wetting properties with relation to the surface mentioned and adapted to be adsorbed thereby and constituting the required gel-connection or bridge between the several parts of these layers there is the eventuality that the relative cohesion of the particles of the gel and their adhesion to the particles of the surface coating of varnish is greatly in excess of the adhesion of the layers of varnish to the bodies to be united to each other. As a result thereof the layers of varnish are likely to be ruptured and to scale off from their supporting surfaces. This fact may be shown for instance by an experiment in which a solution of gelatine is allowed to dry up in an exteriorly glazed porcelain dish. The cohesion of the gelatine particles to each other and their adhesion with relation to the glazed exterior coating is greater than the adhesion of the latter to the supporting surface of porcelain, so that the glazed coating will splinter and come off in the form of small scale-like fragments. It appears therefore that great difficulties are presented by the problem of gluing heterogeneous bodies to each other such as for instance uniting paper to celluloid or uniting two bodies the surfaces of which are provided with coatings such as for instance with layers of varnish or the like, and as additional instances in this connection reference may be made to the uniting of foils or films or sheets of cellulose coated with solutions of cellulose esters.

These various difficulties are obviated by the employment of a gluing agent which is capable of wetting both the two surfaces of the coatings to be directly united as well as of wetting the bodies themselves underneath these layers and which are to be connected to each other, the new gluing agent presenting moreover a sufficiently large degree of adhesion and retaining action with relation to these coating layers and to the bodies themselves, so as to insure a reliable and efficient union of the bodies to each other. In pursuance of a series of experiments conducted with varnish coated bodies it has been ascertained that a highly satisfactory union of such bodies with an adhesive agent may be obtained by employing agents of this kind which are not only adapted to paste the layers of varnish to each other but also to extend their adhesive action through these layers and onto the surfaces it is desired to connect to each other by the gluing operation. In conformity with these requirements my invention provides for the use of adhesive agents possessing a superior retaining and adhesive and sticking action both with relation to the layers of varnish coating as well with relation to the supporting surfaces themselves combined with a certain amount of dissolving action for the varnish coating. By this means it becomes possible not only to firmly unite the layers of varnish coating to each other, but to exert a gluing action upon the supporting surfaces by the judicial selection of the glue, so as to avoid blistering and scaling off of the layers of varnish coating, the union thus obtained reliably resisting separation for any length of time. In case of surface coatings for the bodies to be connected which consist of any other coating material but varnish, the gluing agent should be such that it produces a certain amount of dissolving action upon this coating material aside of the property of adhesion for the bodies and the surface coatings thereof.

The manner of action of the glue or pasting agent according to the invention is shown diagrammatically on the accompanying drawing in sectional view through fractions of the bodies to be united. If it is desired to paste the two bodies 1 and 1' to each other of which one is provided with a surface coating layer 2 and the other one with a surface coating layer 2', the gluing agent a inserted between the two layers 2, 2' should possess the necessary adhesive action required for a reliable union of the coating layers 2, 2', as well as for the bodies 1, 1', and in addition thereto it should present a certain amount of dissolving properties for the coating layers 2, 2'. If the bodies 1, 1' are constituted by sheets of cellulose upon which are disposed superficial layers of varnish consisting of cellulose esters, an adhesive compound should be employed which possesses a satisfactory degree of sticking and adhering properties with relation to the cellulose sheets and the layers of cellulose esters in addition to a certain amount of dissolving action with relation to the varnish coating of cellulose esters. Thus I may use as an instance for the union of two sheets or films of glassy viscose coated with a varnish of nitrocellulose, a gluing compound which contains 10 percent of gum arabic and 40% of sugar and containing an admixture of 50 cc. of acetaldehyde for each 60 grams of this mixture, the remaining percents of the mixture being water. In the case of sheets or films of viscose coated with acetyl-cellulose the pasting agent may for instance consist of 20 percent gelatine, 15 percent glycerine with an addition of 50 cc. acetone for each 60 grams of this compound the balance of this mixture being water. Instead of acetone and acetaldehyde I may also use as additions lactic acid, acetic acid or other suitable solvents which produce a kind of swelling action upon the coating layers of the cellulose body. Instead of gelatine, of gum arabic and sugar I may also use other suitable gluing agents, and the proportions of the different ingredients of the gluing compound may be suitably selected and adjusted in accordance with the requirements of the particular case.

When it is desired to unite bodies of other material but cellulose and in the case of coating layers consisting of other agents different from cellulose-ester-varnishes, the pasting or gluing agent may possibly have to be produced from other ingredients, provided the composition obtained as regards its adhering and sticking properties for the bodies to be united and for the coating layers and as regards dissolving properties for the coating material will correspond to the requirements of this invention. It should also be pointed out in this connection that the invention is not limited to certain specific proportions of the various ingredients, the amount of which will be governed by the materials under consideration and by the convenience of the user and in accordance with the scope of the appended claims.

I claim:—

1. In a method of cementing together cellulose foils capable of swelling in water and provided with a lacquer coating, with their lacquered surfaces juxtaposed, the employment as adhesive of a mixture of a gluing agent and of an organic acid selected from the group containing lactic and acetic acid.

2. A composite sheet composed of two cellulose sheets capable of swelling in water, two juxtaposed lacquer coatings applied to said cellulose sheets and an intermediate layer consisting of a mixture of a gluing agent having good adhesive properties both for the coatings and for the cellulose sheets and of a solvent for the lacquer coatings.

3. A composite sheet composed of two cellulose sheets capable of swelling in water, two juxtaposed lacquer coatings applied to said cellulose sheets and an intermediate layer consisting of a gluing agent and of an organic acid selected from the group containing lactic acid and acetic acid.

4. A method of cementing together cellulose foils capable of swelling in water and provided with a lacquer coating, with their lacquered surfaces juxtaposed which comprises the employment as adhesive of a mixture of gum arabic and sugar and of acetaldehyde.

5. In a method of gluing together cellulose foils provided with a lacquer coating, with their lacquered surfaces juxtaposed, the employment as adhesive of a mixture of gelatine, glycerine and acetone.

6. A composite sheet composed of two cellulose sheets capable of swelling in water, two juxtaposed lacquer coatings applied to said cellulose sheets and an intermediate layer consisting of an adhesive containing gum arabic and sugar and acetaldehyde.

7. A composite sheet composed of two cellulose sheets capable of swelling in water, two juxtaposed lacquer coatings applied to said cellulose sheets and an intermediate layer consisting of a mixture of gelatine, glycerine and acetone.

In testimony whereof I affix my signature.

RICHARD WEINGAUD.

CERTIFICATE OF CORRECTION.

Patent No. 1,888,402.  November 22, 1932.

It is hereby certified that the name of the inventor in the above numbered patent was erroneously written and printed as "Richard Weingaud" whereas said name should have been written and printed as "Richard Weingand"; and that the said Letters Patent should be read with this correction therein that the same may conform to the record of the case in the Patent Office.

Signed and sealed this 7th day of February, A. D. 1933.

M. J. Moore,
Acting Commissioner of Patents.

(Seal)

employment as adhesive of a mixture of gelatine, glycerine and acetone.

6. A composite sheet composed of two cellulose sheets capable of swelling in water, two juxtaposed lacquer coatings applied to said cellulose sheets and an intermediate layer consisting of an adhesive containing gum arabic and sugar and acetaldehyde.

7. A composite sheet composed of two cellulose sheets capable of swelling in water, two juxtaposed lacquer coatings applied to said cellulose sheets and an intermediate layer consisting of a mixture of gelatine, glycerine and acetone.

In testimony whereof I affix my signature.

RICHARD WEINGAUD.

CERTIFICATE OF CORRECTION.

Patent No. 1,888,402.  November 22, 1932.

It is hereby certified that the name of the inventor in the above numbered patent was erroneously written and printed as "Richard Weingaud" whereas said name should have been written and printed as "Richard Weingand"; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.

CERTIFICATE OF CORRECTION.

Patent No. 1,888,402.   November 22, 1932.

It is hereby certified that the name of the inventor in the above numbered patent was erroneously written and printed as "Richard Weingaud" whereas said name should have been written and printed as "Richard Weingand"; and that the said Letters Patent should be read with this correction therein that the same may conform to the record of the case in the Patent Office.

Signed and sealed this 7th day of February, A. D. 1933.

(Seal)

M. J. Moore,
Acting Commissioner of Patents.